United States Patent Office 3,207,944
Patented Sept. 21, 1965

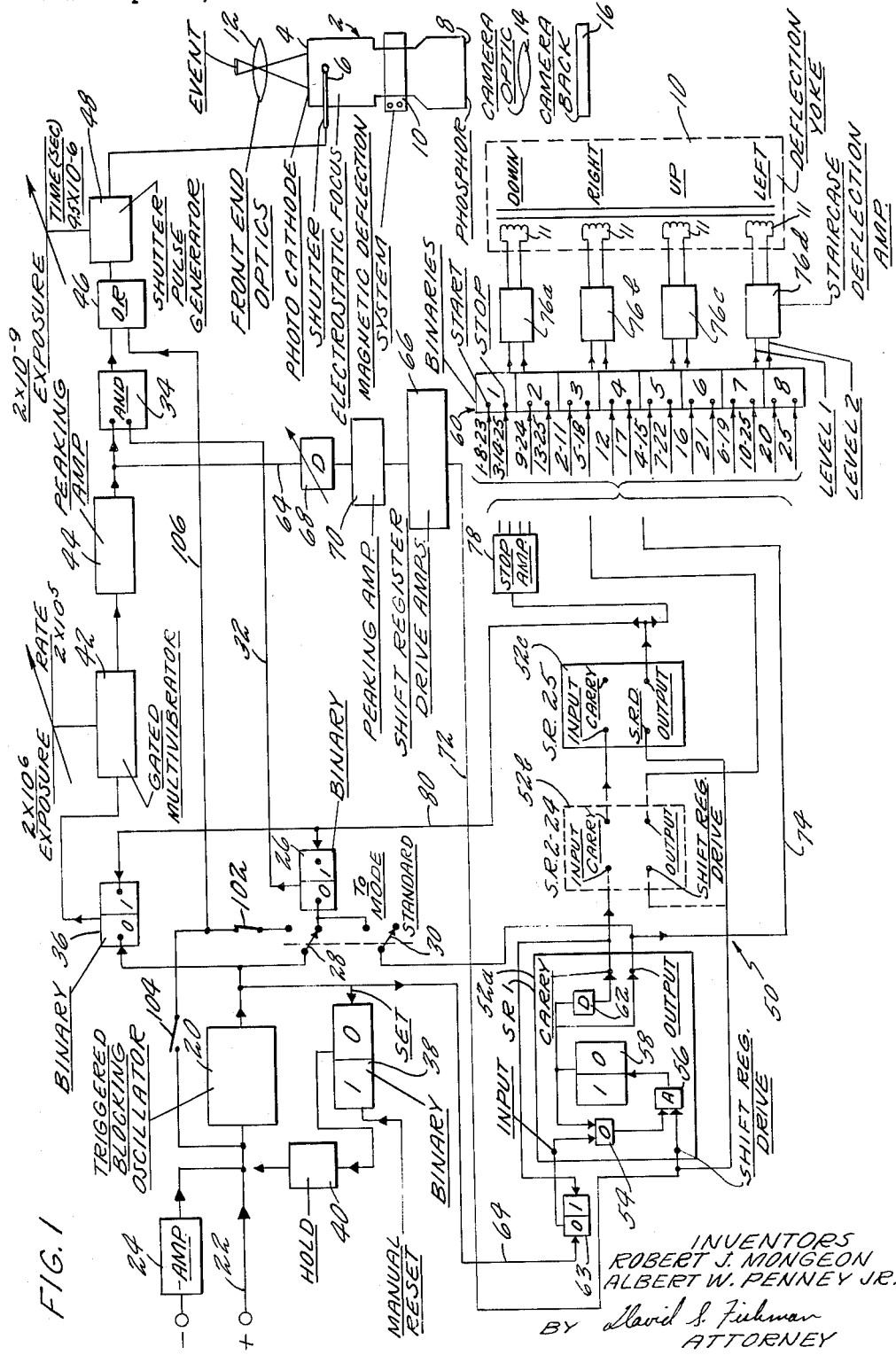
FIG. I
INVENTORS
ROBERT J. MONGEON
ALBERT W. PENNEY JR.
BY David S. Fishman
ATTORNEY

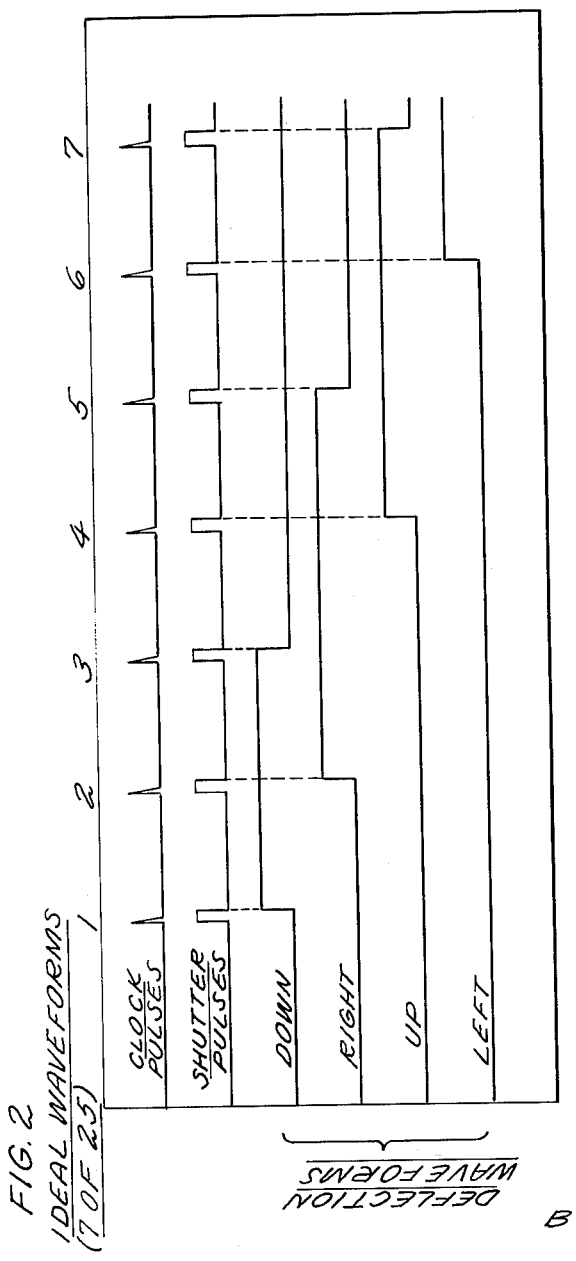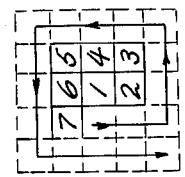

3,207,944
HIGH SPEED CAMERA
Robert J. Mongeon and Albert W. Penney, Jr., Tolland, Conn., assignors to United Aircraft Corporation, East Hartford, Conn., a corporation of Delaware
Filed Sept. 18, 1962, Ser. No. 224,354
21 Claims. (Cl. 315—10)

This invention relates to a high speed camera. More particularly, it relates to a high speed camera system which may be applied to cathode ray, electron beam, or ion beam devices in a high speed image converter camera system.

Previous high speed image converter cameras have been marked by poor resolution characteristics. In addition, previous high speed image converter camera systems have been characterized by deflection of the beam at or before time zero to obtain the initial frame exposure at an extreme horizontal and vertical position in the frame format. This initial deflection in previous systems requires either a steady state current, which represents a power waste, or a significant delay in obtaining the first frame. Also, previous systems have involved a delay of from one microsecond to one and one-half microseconds in accomplishing beam deflection.

The high speed image converter camera system of the present invention overcomes and eleminates the above-enumerated deficiencies in previous high speed image converter camera systems. The present camera is characterized by an initial or time zero exposure which is on axis, i.e., no deflection of the beam for the initial exposure. This allows the initial exposure to be taken with as little as approximately only a two nanosecond delay ($2 \times 10^{-9}$ seconds) and eliminates steady state currents or delays present in previous deflection systems. The deflection sequence which follows the initial on axis or zero deflection exposure is a square spiral originating at or emanating from the initial on axis exposure. This square spiral deflection of the beam simplifies the required deflection wave forms and their generation because, for example, the frequency and power requirements for all deflection units are equal. In addition to the deflection sequencing in the present camera resulting in identical frequency and power requirements for the four deflection amplifiers, this display sequence also further insures that one exposure in each frame is obtained under zero deflection conditions and hence can serve as a reference for detecting any degradation or deterioration in the deflection process.

The image converter camera system of the present invention is capable of producing a burst of exposures on a single frame at speeds ranging from two hundred thousand to two million exposures per second with exposure times ranging from about 2 nanoseconds to 4.5 microseconds. Shuttering or intensity modulation of the beam is done at points in time where image velocity in the plane of the display is ideally zero, and the short duration intensity modulation or shuttering of the beam acts, in effect, to stop the motion of the beam and of the image. These factors, coupled with a low-jitter five-megacycle logic identifying chain and a large bandwidth feedback deflection amplifier system, produce an image converter camera system of much faster response and much higher resolution than heretofore known.

Accordingly, one feature of the present invention is a novel high speed camera system in which a square spiral format of images is produced.

Another feature of the present invention is a novel high speed camera system in which the first picture is taken on axis, i.e., without deflection, so that only the minimum realizable delay is encountered in obtaining the first picture.

Still another feature of the present invention is a novel high speed camera system in which preciseness of deflection of the beam is achieved through a novel feedback deflection amplifier to contribute to the achievement of better resolution than heretofore possible.

Still another feature of the present invention is a novel high speed camera system in which exposure rate and exposure time are coordinated with a logic system for deflection control and in which provision is made for delivering the first operating pulse directly to operate the shutter independent of the rest of the system.

Still another feature of the present invention is a novel high speed camera system in which one exposure in each frame is obtained under zero deflection conditions and hence can serve as a reference for detecting errors in the deflection process.

Other features and advantages will be apparent from the specification and claims, and from the accompanying drawings which illustrate an embodiment of the invention.

FIGURE 1 is a block diagram of the image converter camera and control system of the present invention.

FIGURE 2 depicts idealized wave forms generated in the control system of FIGURE 1 and shows the coordination between the various wave forms.

FIGURE 3 shows a part of the square spiral exposure format accomplished by the camera and control system of the present invention, the numbering in FIGURE 3 representing the order in which exposures are taken.

Figure 4:
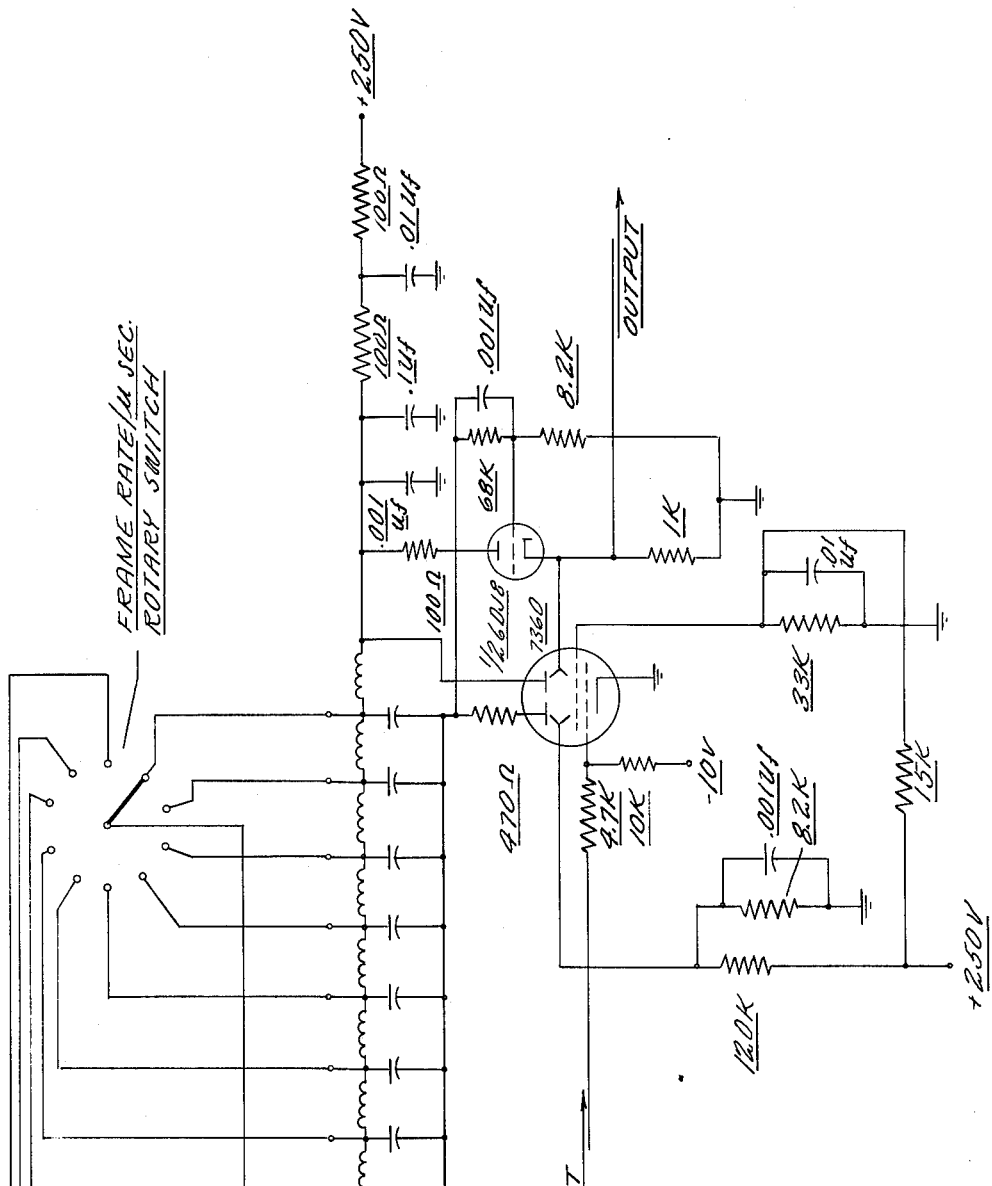
FIGURE 4 is a wiring diagram of an operable two-megacycle gated multivibrator for use in the control system of FIGURE 1.

In the following discussion the preferred embodiment of the present invention will be disclosed in which square spiral format of twenty-five exposures is taken to produce a square of twenty-five exposures. However, to simplify the discussion and to avoid needless repetition the production of only seven exposures will be illustrated, and it will be understood that any number of exposures can be taken by following the teachings of this invention. In addition, except where otherwise indicated, the elements of the block diagram of FIGURE 1 are of types known in the art.

Referring now to FIGURE 1, the high speed camera system includes a shutter image converter tube 2, such as a Rauland R6171 tube, having a photocathode 4, and electrode shutter 6, a phosphor screen 8, and an electromagnetic deflection yoke 10. The deflection yoke 10 has four coils 11 spaced 90° apart around tube 2 to spatially displace electrons emitted from photocathode 4 by horizontally and vertically deflecting electrons emitted from photocathode 4, and the deflection yoke 10 is shown in greater detail in the lower right corner of the drawing. The image of the event to be photographed is focused by lens 12 on photocathode 4, and photocathode 4, in effect, senses the occurrence of the event and emits electrons in a manner indicative of the event. In a well-known manner, an electric potential is established between phosphor screen 8 and photocathode 4 to cause the electrons emitted from photocathode 4 to impinge on screen 8 and produce an image commensurate with the event. The image produced on screen 8 is focused by lens 14 on a conventional camera, such as a Polaroid Land camera, to obtain a permanent record of the image on screen 8.

Shutter 6 is normally maintained at a negative potential to repel the electrons emitted by photocathode 4. When it is desired to generate a series of images on screen 8, the negative potential on shutter 6 is alternately removed and re-established so that the shutter is periodically actuated and beams of charged particles are periodically delivered to screen 8. To accomplish this periodic gating of the electron emission from photocathode 4, a signal indicative of the occurrence of the event to be photographed is delivered to triggered blocking oscillator 20. The signal can, for example, come from a light sensitive photomultiplier which is actuated by the occurrence of the event or can come from a current used to illuminate or produce the event, or can come from any other desired source. If the signal is positive it is delivered to triggered blocking oscillator 20 directly through line 22; if the signal is negative, it is delivered first to inverting amplifier 24 prior to delivery to triggered blocking oscillator 20. Upon receipt of a signal from line 22 or amplifier 24, oscillator 20 will generate an output wave with a 20 nanosecond rise time and a minimum pulse width of 400 nanoseconds. The output from triggered blocking oscillator 20 is delivered directly to binary 26 (shown in the off position) via switch 28 when single pole, double throw switches 28 and 30 are in the position shown in FIGURE 1, which position will be referred to as the standard position. Binary 26 is triggered by the signal delivered to it and delivers a signal via conductor 32 to "and" gate 34 to prime the "and" gate. The output from oscillator 20 is also delivered to binaries 36 and 38 (both shown in the off position), and the output from oscillator 20 triggers binaries 36 and 38. The output from binary 38 triggers a hold circuit 40 to prevent a second signal from being delivered to oscillator 20, and the output from binary 36 is delivered to gated multivibrator 42 to energize the multivibrator which produces a series of pulses. Multivibrator 42 is shown in detail in FIGURE 4, and has output frequencies variable between 200 kilocycles and 2 megacycles and higher as determined by the position of a tapped delay line, and the multivibrator also an output rise time of 50 nanoseconds. The output frequencies of gated multivibrator 42 are determined by the characteristics of the tapped delay line. A range of from 200 kilocycles to 2 megacycles is achieved through a ten-tap line with a total delay of 1.25 microseconds, a delay of .125 microsecond per tap, and a 1000 ω characteristic impedance. Other ranges of frequencies can be achieved through the proper selection of delay time characteristics of the delay line. The output from gated multivibrator 42 is ultimately used to actuate electrode shutter 6 to periodically gate electron flow, and hence it will be seen that shutter 6 can be operated at an exposure rate varying from 200,000 cycles per second to 2,000,000 cycles per second. The series of output pulses from multivibrator 42 are delivered to peaking amplifier 44 which operates to produce the sharply defined pulses labeled clock pulses in FIGURE 2. The output pulses from peaking amplifier 44 are delivered to "and" gate 34, and since "and" gate 34 has ben primed from binary 26, the pulses are passed through the "and" gate to "or" gate 46 and thence to shutter pulse generator 48.

Shutter pulse generator 48 is a pulse generator of a type known in the art having approximately a two-nanosecond output rise time and operable up to approximately a two-megacycle repetition rate. Pulse generator 48 responds to the pulses from multivibrator 42 to generate output pulses which are delivered to electrode shutter 6 and determine the exposure time, i.e., the time for which the shutter is actuated by removing the normally negative bias from shutter 6 so that electrons can pass to screen 8, and the exposure time is variable between approximately 2 nanoseconds and 4.5 microseconds by changing the delay of the pulse width forming network of generator 48. The output pulses from generator 48 and their coordination with the pulses from peaking amplifier 44 are shown in FIGURE 2 and labeled shutter pulses.

The foregoing discussion has explained the manner in which shutter 6 is pulsed to get the flow of electrons from photocathode 4 to screen 8 at desired exposure rates and exposure times. To produce a high speed image converter camera, these beams or streams of electrons must be deflected in coordination with shutter operation to produce the desired format of images on screen 8. To this end, a five-megacycle logic identification chain, such as a series of counting units, or a distributed constant delay line with a series of taps, or a series of shift registers, is coordinated with the above-described shutter actuating mechanism to identify the pulses from multivibrator 42 and supply actuating signals for the beam deflection equipment.

In the present invention the identifying chain includes a series of shift registers, the number of shift registers equalling the number of images it is desired to produce on screen 8 and being twenty-five in the instant system. Shift register 1, the first shift register of the identifying chain, is indicated at 52a, shift registers 2 through 24 are indicated collectively at 52b, and shift register 25 (the final shift register in the chain) is indicated at 52c. Except as otherwise indicated, the details of each shift register unit are identical and the details of only the first shift register in the chain are shown for purposes of clarity and simplification. Each shift register contains an "or" gate 54 in the input circuit, and "and" gate 56 in the drive circuit, a symmetrically triggered binary 58 (shown in the off position), an output circuit which is selctively connected to a bank of binaries 60 each of which has a start and a stop input connection, and a delay 62 in the carry circuit. The carry of each shift register is connected to the input of the succeeding shift register, and shift register 1 receives its input signal via conductor 64 from triggered blocking oscillator 20. In addition, the input line 64 to only shift register 1 has a binary 63 (shown in the off position) which is also connected to receive the carry signal from shift register 1. Binary 63 serves both to insure that there will be a signal delivered to "or" gate 54 to prime "and" gate 56 when the camera is operated at low repetition and long exposure rates with a large delay in unit 68 and to insure that the signal to "or" gate 54 is terminated when the camera is operated at high repetition and short exposure rates so that the width of the pulse from oscillator 20 will not cause an undesired output to be generated by shift register 1.

The output from peaking amplifier 44 has previously been described as being delivered to "and" gate 34, and the output from peaking amplifier 44 is also delivered via conductor 64 to shift register drive amplifier 66. Interposed in conductor 64 between peaking amplifier 44 and shift register drive amplifier 66 is a delay line 68 capable of producing a delay of up to 4.5 microseconds and a peaking amplifier 70 for insuring that sharp signals are delivered to shift register drive amplifier 66.

Each output pulse from shift register drive 66 is delivered simultaneously to the drive circuit of each shift register in the identifying chain. Referring specifically to shift register 52a, the first shift register in the chain, the output signal from oscillator 20 triggers binary 63 and then passes through "or" gate 54 and is delivered to "and" gate 56 to prime the "and" gate. The first output pulse from amplifier 66 is delivered via conductor 72 to "and" gate 56 and passes through the "and" gate to trigger binary 58. The output signal from binary 58 identifies the first pulse from gated multivibrator 42 and is delivered to the output circuit of the shift register and thence via conductor 74 to the start side of binary 1 of binary bank 60. Binary 1 of bank 60 will then deliver a signal to staircase deflection amplifier 76 to institute a downward deflection pulse in deflection yoke 10. The coordination between the deflection pulses and the operation of shutter 6 is shown in FIGURE 2 and will be discussed hereinafter.

The output from binary 58 is also delivered to "or" gate 54 to prime "and" gate 56 and through delay 62 to the carry terminal of shift register 52a. Thus a delayed signal is transmitted from the carry terminal of the first shift register to the input circuit of shift register 2. The output from the carry terminal of shift register 1 is also delivered to return binary 63 to the off position. The second pulse from shift register drive amplifier 66 to the identifying chain causes an output identifying the second pulse from multivibrator 42 to be generated from shift register 2 in the manner just described with regard to shift register 1, and at the same time the second pulse from amplifier 66 combines at "and" gate 56 of shift register 1 with the output from binary 58 of shift register 1 to reset shift register 1 to the off position.

The output from shift register 2 will be delivered to binary 3 of binary bank 60 to supply a signal to amplifier 76b and produce a rightward deflection pulse. In a similar manner, the third pulse from amplifier 66 would be delivered to shift register 3 where it would combine with the carry signal from shift register 2 to produce an output signal to be delivered to the stop side of binary 1 of binary bank 60, and the third pulse from amplifier 66 would reset the binary of shift register 2 to the off position. This sequence would continue until an output signal had been obtained from each of the twenty-five shift registers, each output signal identifying a pulse from gated multivibrator 42, and the output from each shift register would be selectively delivered to binary bank 60 to generate the desired deflection program.

The numbers to the left of binary bank 60 indicate the sequence in which the output from each shift register is delivered to binary bank 60. The top input terminal of each of the binaries of bank 60 is a start input which will cause the binary to deliver an output signal, and the bottom input terminal of each binary is a stop input which will terminate the output from the binary. The outputs from binaries 1 and 2 deliver first and second level deflection signals to amplifier 76a. Likewise, binaries 3 and 4, binaries 5 and 6, and binaries 7 and 8 deliver first and second level input signals to amplifiers 76b, 76c, and 76d, respectively.

The output from shift register 1 is delivered to the start terminal of binary 1 after shutter 6 has been opened to obtain the first exposure. Referring to FIGURE 2 and the lines labeled deflection wave forms, it can be seen that at the termination of the first shutter pulse a first level downward deflection current is generated by amplifier 76a and passed through the properly positioned deflection coil in yoke 10 to generate a downward electromagnetic deflection field for the electrons. As can be seen in FIGURE 3, the first exposure on screen 8 is taken wtih no deflection, and the second shutter pulse is delivered to open shutter 6 when the downward deflection current is present. Thus, the second exposure occurs one level directly below the first exposure. The second deflection signal is delivered from shift register 2 to the start terminal of binary 3 at the end of the second shutter pulse to produce a rightward deflection current through amplifier 76b and the appropriate coil of deflection yoke 10. Since a stop signal has not yet been delivered to binary 1, the outputs from binaries 1 and 3 combine to deflect the electron flow resulting from shutter pulse 3 to produce an image at point 3 in FIGURE 3. The output from shift register 3 is delivered to the stop side of binary 1 at the termination of shutter pulse 3 to terminate the output from binary 1, thus leaving only a rightward deflection signal from binary 3 to deflect the electrons and produce an image at point 4 of FIGURE 3 when shutter pulse 4 occurs. In a similar manner, the pulses from gated multivibrator 42 and peaking amplifier 44 are coordinately delivered to shutter pulse generator 48 and shift register drive amplifier 66 to coordinately operate shutter 6 and the bank of binaries 60 to generate a square spiral series of twenty-five images on screen 8. In order to avoid unnecessary repetition, FIGURES 2 and 3 have been limited to showing only seven coordinated pulses, but the remaining pulses and wave forms will be readily apparent to those having ordinary skill in the art.

The output from shift register 25 is delivered, following the twenty-fifth gating of shutter 6, to terminate the outputs from binaries 1, 2, 7, and 8 which were active to produce the necessary deflection position of the twenty-fifth exposure in the lower left-hand corner of the format shown in FIGURE 3. Both to meet the requirements of the logic system and to insure enough power to stop all four binaries, the output from shift register 25 is delivered to stop amplifier 78 and each of binaries 1, 2, 7, and 8 is triggered by a separate output line from stop amplifier 78. The separate output lines from amplifier 78 to each of the four binaries are necessary to decouple these binaries from each other and prevent any previous signal to any one of these binaries from being recirculated to all four of these binaries.

The output signal from shift register 25 is also delivered via conductor 80 to binaries 26 and 36 to switch these binaries back to the off position as shown in FIGURE 1. No use is made of the carry signal from shift register 25, but it is apparent that the carry output could be used to switch binaries 26 and 36 off. The switching of binary 36 to the off position terminates the signal to gated multivibrator 42 and thus terminates the action of the camera system by shutting off the gated multivibrator and thus terminating the output from the gated multivibrator to terminate the shutter pulses and the shift register drive pulses. This insures that only the desired number of exposures will be taken and prevents a recycling of the system which would result in double exposures. The switching of binary 26 to the off position terminates the signal previously delivered via conductor 32 to "and" gate 34, and acts as a further assurance that no exposures will be taken after the twenty-fifth exposure. Thus, if a malfunction should occur so that the signal from binary 36 to gated multivibrator 42 was not terminated, no further multivibrator output would be delivered to shutter pulse generator 48 because the "and" gate would be closed. A manual reset is provided to reset binary 38 and remove the hold from the input to triggered blocking oscillator 20, thereby preparing the system for another cycle.

Figure 5:
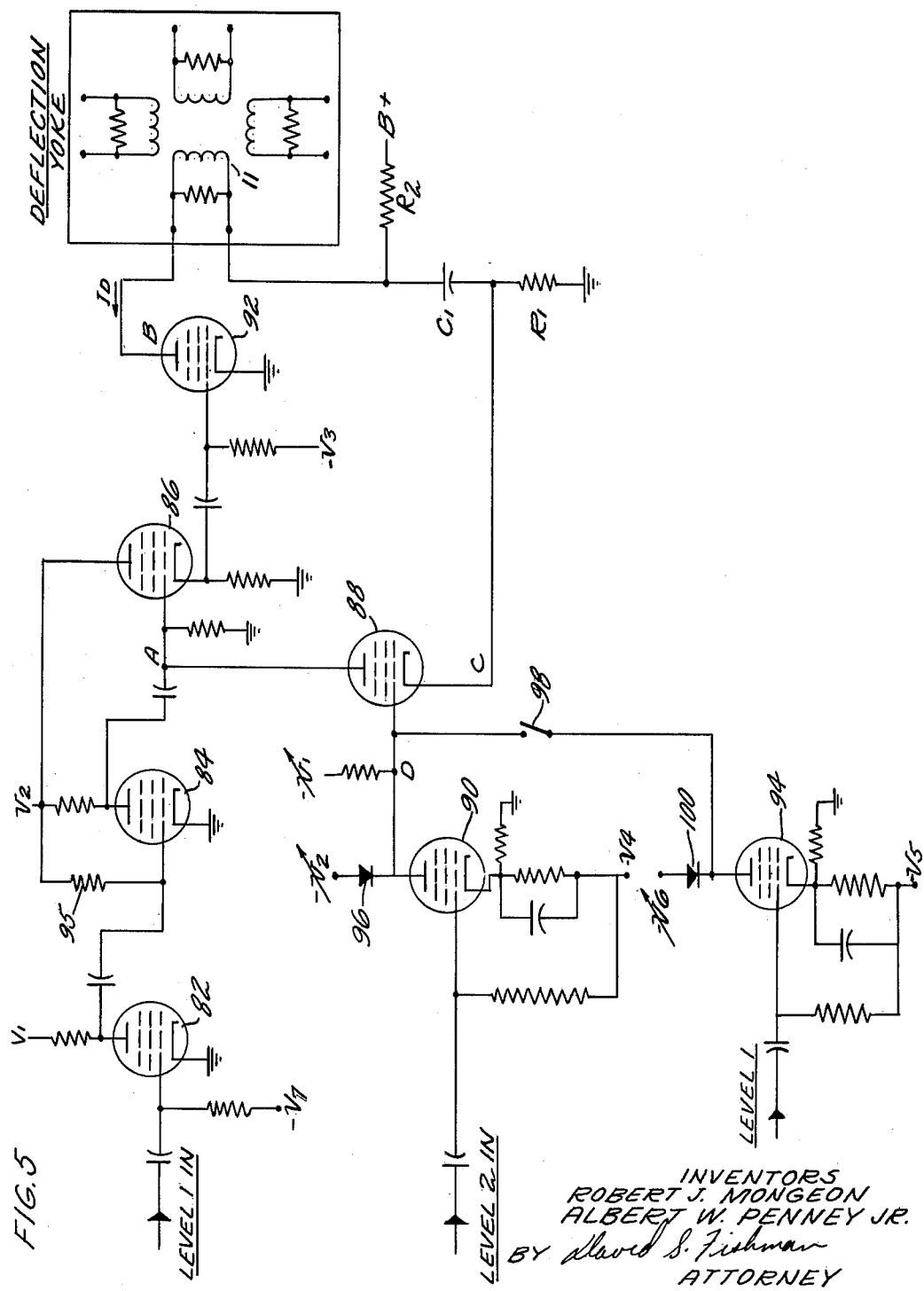
FIGURE 5 is a simplified wiring diagram of one of the staircase deflection amplifiers of FIGURE 1.
Figure 6:
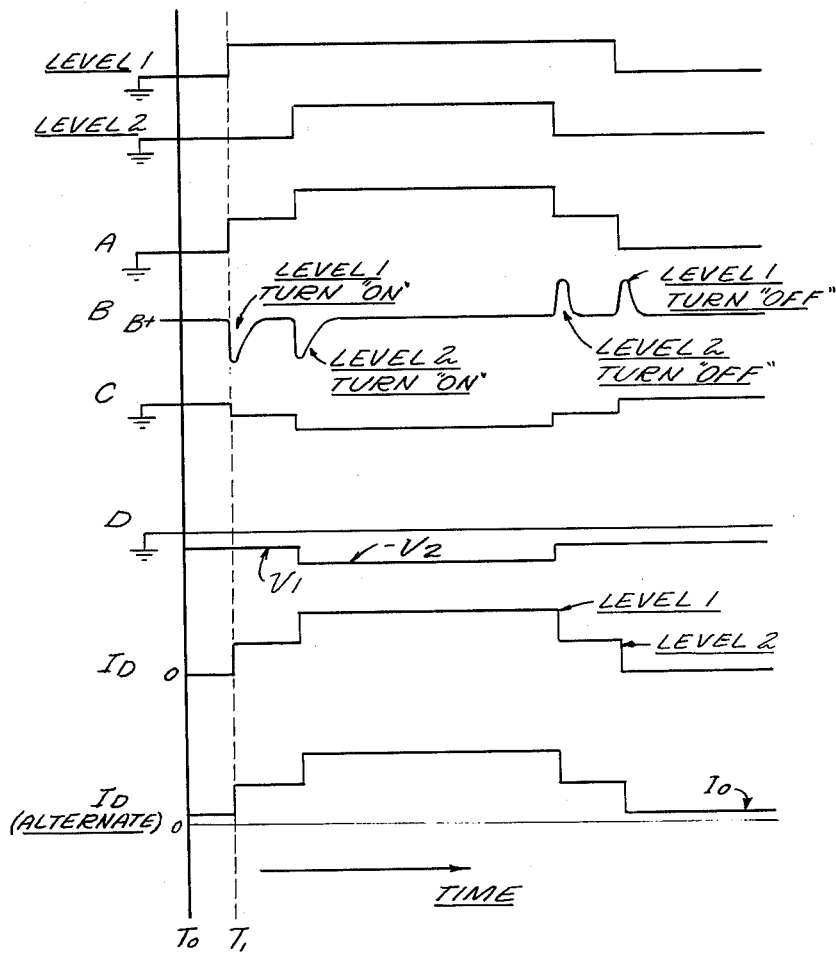
FIGURE 6 shows wave forms associated with the operation of the staircase deflection amplifier of FIGURE 5.

Referring now to FIGURES 5 and 6, the details and wave forms of one of the feedback deflection amplifiers are shown, all four feedback deflection amplifiers being identical in construction. The amplifiers have a current feedback feature which contributes to large bandwidth capability and identical response for the four amplifiers. Peak power delivered to the yoke during a deflection is about 1 kw. with about 900 watts average power dissipated in each output amplifier per frame. As has been previously explained, each feedback deflection amplifier is connected to a coil 11 in deflection yoke 10, and each feedback deflection amplifier receives level 1 and level 2 input signals from binary bank 60 and delivers level 1 and level 2 current steps to the deflection coils to produce the square spiral deflection format. Tubes 82, 84, 90 and 94 act as switches, tube 86 acts as a cathode follower, tube 88 acts as a voltage comparator with amplification, and tube 92, which may be a beam forming power tube, acts as a power amplifier to produce a suitable deflection current $I_D$ through the deflection coil to which the amplifier is attached.

At time $T_0$ before any signal is delivered to a feedback deflection amplifier, tube 82 is off, tube 84 is on, tube 86 is off or is conducting to such a minor extent that it is considered to be basically off, tube 88 is off, tube 90 is off, and tube 92 is off; and the wave forms at points A, B, C, D, and the deflection current $I_D$ are as shown in FIGURE 6. At time $T_1$ a level 1 input signal is delivered from a binary in bank 60 to the grid of tube 82 and tube 82 is switched on. As a result of tube 82 being turned on, a negative pulse is delivered to the grid of tube 84.

The grid clamp resistor 95 of the grid circuit of tube 84 is very high so that the grid of tube 84 was at essentially zero voltage when the tube was on, and the negative going pulse delivered from the plate circuit of tube 82 to the grid of tube 84 biases tube 84 off. As a result of tube 84 shutting off, a positive going pulse is transmitted to the grid of tube 86 to turn tube 86 on, and the voltage at point A rises as shown in FIGURE 6. Since the grid of tube 92 is in the cathode circuit of tube 86, the grid voltage of tube 92 increases as a result of tube 86 being turned on, and tube 92 is turned on.

The plate of tube 92 is connected to one side of a deflection coil 11, the other side of the deflection coil is connected to the B+ supply through a large decoupling resistor $R_2$ and is also connected to a large capacitor $C_1$ and a small current measuring resistor $R_1$. As can be seen in FIGURE 6, before tube 92 is turned on (time $T_0$), the voltage at point B (the plate voltage of tube 92) is at the B+ level, the capacitor $C_1$ is fully charged, and the voltage at point C (between capacitor $C_1$ and resistor $R_1$) is at ground level.

At time $T_1$, the level 1 input signal is delivered to tube 82, and tube 92 is turned on. When tube 82 is turned on, capacitor $C_1$ starts to discharge to supply a deflection current $I_D$ through coil 11, tube 92, and current measuring resistor $R_1$. Capacitor $C_1$ acts as the power supply because the B+ supply is effectively decoupled by resistor $R_2$. As can be seen from FIGURE 6, the plate voltage of tube 92 drops considerably because of the inductance of coil 11 and then returns to a level slightly less than B+, and the current $I_D$ rises in a step. The deflection current passing through resistor $R_1$ results in a lowering of the voltage at C thereby lowering the cathode voltage of tube 88. A negative bias ($-v_1$) had previously been imposed on the grid of tube 88, and the lowering of the cathode voltage of tube 88 causes tube 88 to be turned on when the desired level of deflection current is reached, the voltage $-v_1$ being selected to obtain the desired constant value of level 1 deflection current. The turning on of tube 88 regulates the voltage level at point A and hence the grid voltage of tube 92 to maintain a desired constant level of deflection current $I_D$, and any variation in deflection current varies the cathode voltage of tube 88 and the voltage at point A to maintain the desired level of deflection current. When a level 2 deflection signal is generated at one of the binaries of bank 60, it is delivered to the grid of tube 90 to turn tube 90 on. The supply $-v_2$ for tube 90 is selected to obtain the desired constant value of level 2 deflection current and is more negative than $-v_1$, and when tube 90 starts to conduct, the voltage at point D decreases to cause diode 96 to conduct and clamp $-v_2$ on the grid of tube 88. As a result, tube 88 is turned off, the voltage at point A and hence the grid voltage of tube 92 increases and current $I_D$ increases in a step to a second deflection level. As $I_D$ steps up to the second level, the voltage at point C decreases thereby causing tube 88 to be turned on once again to regulate $I_D$ in the manner previously described to maintain a desired constant second level of deflection current.

Removal of the level 2 input signal from tube 90 removes the effect of tube 90 and supply $-v_2$ from the system and the amplifier then continues to operate as previously described with only the level 1 input signal, and removal of the level 1 input signal of tube 82 terminates the output current $I_D$ from the amplifier.

As an alternate method of operating the amplifier, a gate such as the output from binary 36 can be delivered to tube 82 in each amplifier to generate a very small steady state deflection current in all four deflection coils. Normally opened switch 98 would be closed to connect the plate of normally off tube 94 to the grid of tube 88, the supply voltage $-v_6$ being selected to obtain the desired constant value of level 1 deflection current and being less negative than the supply $-v_2$ of tube 90 and more negative than the grid bias $-v_1$ of tube 88. The level 1 input signal would then be delivered to the grid of tube 94 to turn tube 94 on, thereby causing diode 100 to conduct and clamping $-v_6$ to the grid of tube 88 to regulate $I_D$ to a constant value in the manner previously described. In this alternative configuration, the level 2 input signal would again be delivered to the grid of tube 90 to clamp $-v_2$ on the grid of tube 88 to establish and maintain a second level constant deflection current.

Returning now to FIGURE 1, the structure of the system will be described whereby the first exposure can be taken with a minimum delay. Single pole double-throw switches 28 and 30 would be moved to close on the upper contacts, a position termed the $T_0$ mode rather than the standard position as shown, switch 102 would be closed, and normally open switch 104 would be left open. With the switches in the positions just described, the output from triggered blocking oscillator 20 would be delivered through switch 28, switch 102, and conductor 106 directly to "or" gate 46 rather than to the binary 26. The output pulse from oscillator 20 would pass through "or" gate 46 and actuate shutter pulse generator 48 to generate the first pulse to shutter 6 to obtain the first exposure. In this way, the delays which would otherwise be encountered in binary 36, gated multivibrator 42, peaking amplifier 44, and "and" gate 34 are eliminated. The output from triggered blocking oscillator 20 is delivered to shift register 52a as in the standard mode of operation, and the output from shift register 52a is delivered via switch 30 to binary 26 to trigger binary 26 and deliver a signal via conductor 32 to prime "and" gate 34. The operation of the rest of the system is the same as previously described when switches 28 and 30 are in the standard position, and the different result obtained in the $T_0$ mode is that the first pulse from gated multivibrator 42 is delivered to the shift register chain but not to shutter pulse generator 48 (because "and" gate 34 is not primed until an output is obtained from shift register 52a), and the first shutter pulse is obtained with a minimum of delay.

A second $T_0$ mode of operation which could be employed if the input to triggered blocking oscillator 20 is itself a fast rise time pulse, would be to close normally opened switch 104 and open switch 102 while retaining switches 28 and 30 in the $T_0$ mode. Under these conditions, the input to triggered blocking oscillator 20 would also be delivered directly to "or" gate 46 and thence to pulse generator 48 to generate the first pulse, and in this event the delay of triggered blocking oscillator 20 would be avoided and the delay in obtaining the first exposure would be determined by the characteristics of pulse generator 48 so that the delay in the present system could be reduced to approximately only 2 nanoseconds.

With reference to FIGURE 2, it can be seen that the synchronization and coordination between the shuttering of the camera and the energizing of the deflection yoke is such that a shutter pulse is generated to open and close the shutter to produce an image, and then the deflection yoke is energized to accomplish the desired deflection for the next image, and then another shutter pulse is generated to produce another image after the deflection process is stabilized. It will be observed that the significance of this arrangement is that shuttering of the beam of electrons is done at points in time where image velocity of the beam in the plane of the display is zero. In addition, the design of the identifying chain minimizes jitter in deflection generation thereby contributing to high resolution and high information handling capacity. It will also be observed that the delay of element 68 must equal the exposure pulse width plus the delay in generating the exposure pulse minus the delay in generating the output from a deflection amplifier. Thus, when the exposure pulse width plus the delay in generating the exposure pulse is less than the delay in generating an output from a deflection amplifier, delay unit 68 will be placed in the shutter pulse generator circuit rather than in the deflection circuit.

It is to be understood that the invention is not limited to the specific embodiment herein illustrated and described but may be used in other ways without departure from its spirit as defined by the following claims.

We claim:

1. A high speed camera including means for sensing the occurrence of an event and generating a signal indicative of the event, means responsive to said signal for producing a first image commensurate with the event, and means for spatially displacing said signal to generate a series of images in a spiral path originating at said first image.

2. A high speed camera including means for sensing the occurrence of an event and generating a signal indicative of the event, means responsive to said signal for producing a first image commensurate with the event, means for periodically gating the signal, and means for periodically spatially displacing said signal to generate a series of images in a spiral path originating at said first image.

3. A high speed camera as in claim 2 including means coordinating said gating means and said displacing means subsequent to the production of said first image.

4. A high speed camera including means for sensing the occurrence of an event and generating a beam of charged particles indicative of the event, means activated by said beam of charged particles for producing a first image commensurate with the event, and means for deflecting said beam of charged particles to generate a series of images in a spiral path originating at said first image.

5. A high speed camera including means for sensing the occurrence of an event and generating a beam of charged particles indicative of the event, means activated by said beam of charged particles for producing a first image commensurate with the event, means for periodically gating said beam of charged particles, and means for periodically deflecting said beam of charged particles to generate a series of images in a spiral path originating at said first image.

6. A high speed camera as in claim 5 including means coordinating said gating means and said displacing means subsequent to the production of said first image.

7. A high speed camera including means for sensing the occurrence of an event and generating a signal indicative of the event, image producing means responsive to said signal, means for delivering said signal directly to said image producing means to produce a first image, means for periodically gating said signal, means for periodically spatially displacing said signal, and means coordinating said gating means and said displacing means to generate a series of images in a spiral path originating at said first image.

8. A high speed camera including means for sensing the occurrence of an event and generating a beam of charged particles indicative of the event, image producing means responsive to said beam of charged particles, means for delivering said beam of charged particles directly to said image producing means to produce a first image, means for periodically gating said beam of charged particles, means for periodically deflecting said beam of charged particles, and means for coordinating said gating means and said deflecting means to generate a series of images in a spiral path originating at said first image.

9. A high speed camera including an image converter tube having an electron emissive photocathode, a shutter for gating the flow of electrons and an electron responsive image producing surface, first means for actuating said shutter to deliver a first stream of electrons directly from said photocathode to said image producing surface to produce a first image, second means for periodically actuating said shutter to deliver streams of electron to said image producing surface subsequent to said first stream of electrons, means for periodically deflecting said subsequent streams of electrons, and means for coordinating said second actuating means and said deflecting means to generate a series of images in a spiral path originating at said first image.

10. A high speed camera as in claim 9 wherein said first means for actuating the shutter includes means for generating an electric pulse, an "or" gate connected to receive the output of said pulse generator, and pulse shaper means connected to receive the output of said "or" gate.

11. A high speed camera as in claim 10 wherein the second means for actutaing the shutter includes means responsive to said electric pulse for generating a series of pulses, an "and" gate connected to said "or" gate, means for delivering the output from said series pulse generating means to said "and" gate, and means responsive to the output from said pulse generator for delivering a signal to said "and" gate.

12. A high speed camera as in claim 11 wherein said coordinating means includes means for identifying the output pulses of said series pulse generator and producing signals thereof, means for delivering the output pulses of said series pulse generator to said identifying means, and means for delivering signals from said identifying means to said deflecting means.

13. A high speed camera as in claim 12 including means responsive to the final signal of said identifying means for terminating the delivery of the output from said means for generating a series of pulses to said identifying means.

14. A high speed camera including an image converter tube having an electron emissive photocathode, a shutter for gating the flow of electrons, deflection means and an electron responsive image producing surface, means for generating a pulse indicative of the occurrence of an event to be observed, means responsive to the output from said pulse generating means for generating a series of pulses, means for actuating said shutter, means for delivering the output from said means for generating a series of pulses to said shutter actuating means, means including a series of elements for identifying the output pulses of said series pulse generator and producing signals thereof, and means for selectively delivering the outputs from said identifying means to said deflection means to produce a series of images in a spiral path on said image producing surface.

15. A high speed camera as in claim 14 including means for delivering a signal to said pulse generating means indicative of the occurrence of an event to be photographed, and means for delivering said signal to said shutter actuating means concomitantly with the delivery of said signal to said pulse generating means.

16. A high speed camera as in claim 14 including means for delivering the output from said pulse generating means to said shutter actuating means concomitantly with the delivery of the output from said pulse generating means to said means for generating a series of pulses whereby the shutter is actuated with a minimum of delay.

17. A high speed camera as in claim 14 including an "or" gate connected to said shutter actuator and to said pulse generating means and said means for generating a series of pulses, an "and" gate connected between said "or" gate and said means for generating a series of pulses, means for delivering the output from said pulse generating means to said shutter actuating means concomitantly with the delivery of the output from said pulse generating means to said means for generating a series of pulses to actuate said shutter with a minimum of delay, and means responsive to the output of the first element of said identifying means for setting said "and" gate to pass the output from said means for generating a series of pulses.

18. A high speed camera as in claim 14 including means responsive to the output of the final element of said identifying means for terminating the output from said means for generating a series of pulses.

19. A high speed camera including an image converter tube having an electron emissive photocathode, a shutter for gating the flow of electrons, an electron responsive image producing surface, and deflection means between said photocathode and said image producing surface, means for actuating said shutter to pass electrons from said photocathode to said image producing surface, means for generating a program of signals for said deflection means to deflect the electrons in a path to generate a spiral pattern on said image producing surface starting at the center of said image producing surface, and amplifying means connected between said means for generating a program of signals and said deflection means for delivering a deflection current to said deflection means, said amplifying means including means responsive to said deflection current for regulating the deflection current.

20. A high speed camera as in claim 19 wherein said means for generating a program of signals includes means for delivering first and second signals to said amplifying means, the amplifying means including means to responsive to said first signal for delivering a first deflection current to the deflection means, and means responsive to said second signal for delivering a second deflection current to said deflection means.

21. A high speed camera as in claim 19 wherein said means for generating a program of signals includes means for delivering first and second signals to said amplifying means, the amplifying means including means responsive to said first signal for delivering a first deflection current to said deflection means, means for sensing the first deflection current and regulating the first deflection current, and means responsive to said second signal for biasing said regulating means to deliver a second deflection current to said deflection means sensed and regulated by said regulating means.

References Cited by the Examiner

UNITED STATES PATENTS

| | | | |
|---|---|---|---|
| 2,401,779 | 6/46 | Swartzel | 179—171 |
| 2,601,271 | 6/52 | French et al. | 323—4 |
| 2,663,795 | 12/53 | Mohr | 250—27 |
| 2,859,377 | 11/58 | Clemens et al. | 315—10 |
| 2,871,400 | 1/59 | Buntenbach | 315—10 |
| 2,927,217 | 3/60 | Allen et al. | 250—217 |

DAVID G. REDINBAUGH, *Primary Examiner.*